(12) United States Patent
Hiyama et al.

(10) Patent No.: US 11,215,116 B2
(45) Date of Patent: Jan. 4, 2022

(54) TURBINE MOVING BLADE AND GAS TURBINE

(71) Applicant: Mitsubishi Hitachi Power Systems, Ltd., Kanagawa (JP)

(72) Inventors: Takashi Hiyama, Tokyo (JP); Kazuya Nishimura, Yokohama (JP); Keita Takamura, Yokohama (JP); Susumu Wakazono, Yokohama (JP); Daigo Fujimura, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 125 days.

(21) Appl. No.: 16/486,603

(22) PCT Filed: Feb. 23, 2018

(86) PCT No.: PCT/JP2018/006730
§ 371 (c)(1),
(2) Date: Aug. 16, 2019

(87) PCT Pub. No.: WO2018/155635
PCT Pub. Date: Aug. 30, 2018

(65) Prior Publication Data
US 2020/0056540 A1 Feb. 20, 2020

(30) Foreign Application Priority Data

Feb. 23, 2017 (JP) .............................. JP2017-031767

(51) Int. Cl.
*F02C 3/04* (2006.01)
*F01D 5/14* (2006.01)
*F23R 3/26* (2006.01)

(52) U.S. Cl.
CPC ................ *F02C 3/04* (2013.01); *F01D 5/147* (2013.01); *F23R 3/26* (2013.01); *F05D 2220/32* (2013.01)

(58) Field of Classification Search
CPC ... F02C 3/04; F01D 5/147; F01D 5/20; F01D 5/225; F01D 11/08; F23R 3/26;
(Continued)

(56) References Cited

U.S. PATENT DOCUMENTS

| 2008/0025841 A1 | 1/2008 | Norton et al. |
| 2011/0027088 A1 | 2/2011 | Piersall et al. |

(Continued)

FOREIGN PATENT DOCUMENTS

| JP | 10-306702 | 11/1998 | | |
| JP | 10306702 A | * 11/1998 | ............. | F01D 5/225 |

(Continued)

OTHER PUBLICATIONS

International Search Report dated Apr. 17, 2018 in International (PCT) Application No. PCT/JP2018/006730, with English translation.

(Continued)

*Primary Examiner* — Jacob M Amick
*Assistant Examiner* — Charles J Brauch
(74) *Attorney, Agent, or Firm* — Wenderoth, Lind & Ponack, L.L.P.

(57) ABSTRACT

A turbine blade includes a blade body in which a suction side (51) facing one side in a circumferential direction and a pressure side (52) facing the other side in the circumferential direction are connected at a leading edge and a trailing edge; and a shroud provided at a tip which is a radially outer end portion of the blade body. The shroud includes a shroud body having an outer circumferential surface facing radially outward, a front end surface extending to both sides in the circumferential direction with a leading edge side of the blade body as a reference point (P1), a rear end surface extending to both sides in the circumferential direction with a trailing edge side of the blade body as a reference point (P2), and a contact surface provided on both sides in the (Continued)

circumferential direction, and a reinforcing portion which protrudes from the outer circumferential surface.

14 Claims, 5 Drawing Sheets

(58) Field of Classification Search
CPC ............. F05D 2220/32; F05D 2260/94; F05D 2240/307; F05D 2240/80
See application file for complete search history.

(56) References Cited

U.S. PATENT DOCUMENTS

2012/0003078 A1    1/2012  Pikul et al.
2013/0149165 A1    6/2013  Boeck
2015/0017003 A1*   1/2015  Shaffer ................... F01D 5/225
                                                              416/182
2015/0226070 A1    8/2015  Plante et al.

FOREIGN PATENT DOCUMENTS

| JP | 2005-207294 | 8/2005 |
| JP | 5246840 | 7/2013 |
| JP | 5681384 | 3/2015 |
| JP | 2015-90134 | 5/2015 |

OTHER PUBLICATIONS

Written Opinion of the International Searching Authority dated Apr. 17, 2018 in International (PCT) Application No. PCT/JP2018/006730, with English translation.

* cited by examiner

TURBINE MOVING BLADE AND GAS TURBINE

TECHNICAL FIELD

The present invention relates to a turbine blade and a gas turbine.

Priority is claimed on Japanese Patent Application No. 2017-031767, filed Feb. 23, 2017, the content of which is incorporated herein by reference.

BACKGROUND ART

For example, as a turbine blade of a gas turbine, one having a shroud at a blade end portion is known (see, for example, Patent Literature 1). In particular, in long blades of a final stage of the turbine, contact surfaces of the shrouds of the respective adjacent turbine blades come into contact with each other to suppress vibration occurring at the time of high-speed rotation. Further, fins extending in a circumferential direction are provided on outer circumferential surfaces of the shrouds. This prevents the combustion gas for driving the turbine from flowing out from a clearance formed between an inner circumferential surface of a casing and the outer circumferential surfaces of the shrouds.

CITATION LIST

Patent Literature

Patent Literature 1

Japanese Unexamined Patent Application, First Publication No. 2005-207294

SUMMARY OF INVENTION

Technical Problem

Incidentally, with the increases in output and performance of recent gas turbines, in particular, the blades of the final stage of the turbine are being made longer. In order to reduce a flow velocity of an exhaust gas discharged from the turbine as much as possible and to increase turbine efficiency, it is effective to extend a blade length of the blades of the final stage and to increase a contact area.

On the other hand, as blades become longer in this way, since a centrifugal force acting on the shrouds also increases, in particular, the stress of root portions of the shrouds against the blade bodies considerably increases. In contrast, for example, a method of enhancing rigidity by enlarging a fillet when welding a blade body and a shroud is known. However, since the fillet protrudes in a main flow passage of the combustion gas, the work of the combustion gas is hindered, which causes a decrease in efficiency.

Here, for the turbine blades described in Patent Literature 1, a configuration in which the stress is reduced by providing reinforcing ribs in a region from the contact surfaces of the shrouds to leading edges of the blade bodies and regions from the contact surfaces to trailing edge of the blade bodies is disclosed. However, in the turbine blades, existing regions of the reinforcing ribs are not sufficient, and it is not possible to properly cope with the occurring stress.

The present invention has been made in view of such circumstances, and an object thereof is to provide a turbine blade and a gas turbine capable of resisting the stress occurring in a shroud, while suppressing a decrease in efficiency.

Solution to Problem

A turbine blade according to a first aspect of the present invention includes a blade body in which a suction side facing one side in a circumferential direction and a pressure side facing the other side in the circumferential direction are connected at a leading edge and a trailing edge and which extends in a radial direction; and a shroud provided at a tip which is a radially outer end portion of the blade body, in which the shroud includes a shroud body which has an outer circumferential surface facing radially outward, a front end surface extending to both sides in the circumferential direction with a leading edge side of the blade body as a reference point, a rear end surface extending to both sides in the circumferential direction with a trailing edge side of the blade body as a reference point, and a contact surface provided on both sides in the circumferential direction, and a reinforcing portion which protrudes from the outer circumferential surface and extends over the front end surface and the rear end surface.

According to the turbine blade of the above configuration, the reinforcing portion is formed over the front end surface and the rear end surface of the shroud body. Thus, the reinforcing portion is over the entire region between the leading edge and the trailing edge of the blade body. For this reason, rigidity can be secured in the entire region of the root portion of the shroud with respect to the blade body. In addition, since the reinforcing portion is provided on the outer circumferential surface of the shroud, it does not affect the main flow passage of a combustion gas.

In the aforementioned turbine blade, the front end surface may have a first front end surface extending from the reference point of the leading edge side to the one side in the circumferential direction, and a second front end surface extending to intersect the first front end surface from the reference point of the leading edge side toward the other side in the circumferential direction, the rear end surface may have a first rear end surface extending from the reference point of the trailing edge side to the one side in the circumferential direction, and a second rear end surface extending to intersect the first rear end surface from the reference point of the trailing edge side toward the other side in the circumferential direction, and the reinforcing portion may have a first reinforcing rib extending over the first front end surface and the first rear end surface.

Since the first reinforcing rib is formed on one side in the circumferential direction, that is, on the suction side of the blade body, especially when the stress on the suction side of the blade body in the shroud increases, it is possible to cope with the stress by an increase in the rigidity due to the first reinforcing rib.

In the aforementioned turbine blade, the shroud may include a first fillet portion which is formed at a portion on which the suction side of the blade body and the inner circumferential surface of the shroud body are connected, and which extends to form a curved surface shape from the pressure side of the blade body to the inner circumferential surface of the shroud body, and the first reinforcing rib may be disposed to overlap the first fillet portion in the circumferential direction across the shroud body.

A centrifugal force acts on the shroud body radially outward with the rotation of the turbine blade. However, as the turbine blade is made longer for the purpose of improving the operation efficiency of the gas turbine, since the centrifugal force acting on the shroud body also increases, it is necessary to take countermeasures. In the past, measures such as enhancing the strength by increasing the fillet portion formed at the connection portion between the blade body and the shroud body have also been taken. However, increasing the fillet portion is not preferable because a cross-sectional area of the combustion gas main flow passage inside the shroud is reduced, which interferes with the purpose of lengthening the turbine blade.

The first fillet portion extending to form a curved surface shape from the suction side of the blade body to the inner circumferential surface of the shroud body is formed at a portion of the turbine blade on which the suction side of the blade body and the inner circumferential surface of the shroud body are connected, and the first reinforcing rib overlaps the first fillet portion in the circumferential direction across the shroud body. Thus, even if the centrifugal force acting on the shroud body increases with the increase in length of the turbine blade, the influence of the centrifugal force on the shroud body can be reduced without reducing the cross-sectional area of the gas main flow passage. That is, since the rigidity of the shroud on the suction side of the blade body increases, even if the stress on the suction side of the blade body in the shroud increases, the deformation of the shroud body can be suppressed.

In the aforementioned turbine blade, the reinforcing portion may further include a second reinforcing rib extending over the second front end surface and the second rear end surface.

Since the second reinforcing rib is formed on the other side in the circumferential direction, that is, on the pressure side of the blade body, particularly when the stress on the pressure side of the blade body in the shroud increases, it is possible to cope with the stress by the increase in the rigidity due to the second reinforcing rib. That is, since the first reinforcing rib is on the suction side of the blade body and the second reinforcing rib is on the pressure side, it is possible to form a high rigidity region from the leading edge to the trailing edge of the blade body on both sides of the blade body.

In the aforementioned turbine blade, the front end surface may have a first front end surface extending from the reference point of the leading edge side to the one side in the circumferential direction, and a second front end surface extending to intersect the first front end surface from the reference point of the leading edge side toward the other side in the circumferential direction, the rear end surface may have a first rear end surface extending from the reference point of the trailing edge side to the one side in the circumferential direction, and a second rear end surface extending to intersect the first rear end surface from the reference point of the trailing edge side toward the other side in the circumferential direction, and the reinforcing portion may have a second reinforcing rib extending over the second front end surface and the second rear end surface.

In the aforementioned turbine blade, the shroud may include a second fillet portion which is formed at a portion on which the suction side of the blade body and the inner circumferential surface of the shroud body are connected, and which extends to form a curved surface shape from the pressure side of the blade body to the inner circumferential surface of the shroud body, and the second reinforcing rib may be disposed to overlap the second fillet portion in the circumferential direction across the shroud body.

In the turbine blade, the second fillet portion extending to form a curved surface shape from the pressure side of the blade body to the inner circumferential surface of the shroud body is formed at a portion of the turbine blade on which the pressure side of the blade body and the inner circumferential surface of the shroud body are connected, and the second reinforcing rib overlaps the second fillet portion in the circumferential direction across the shroud body. Thus, even if the centrifugal force acting on the shroud body increases with the increase in length of the turbine blade, the influence of the centrifugal force on the shroud body can be reduced without reducing the cross-sectional area of the gas main flow passage. That is, since the rigidity of the shroud on the pressure side of the blade body increases, even if the stress on the pressure side of the blade body in the shroud increases, deformation of the shroud body can be suppressed.

A gas turbine according to a second aspect of the present invention includes a compressor which compresses air to generate high-pressure air; a combustor which combusts the high-pressure air to generate a combustion gas; and a turbine which includes a plurality of blade stages in which a plurality of blades are arranged in a circumferential direction and is driven by the combustion gas, wherein the blades of a last blade stage among the plurality of blade stages are turbine blades according to any one of the aforementioned aspects.

This can increase the rigidity of the shroud in the final stage of the turbine.

Advantageous Effects of Invention

According to the turbine blade and the gas turbine of the present invention, it is possible to resist the stress occurring in the shroud, while suppressing the decrease in efficiency.

DESCRIPTION OF EMBODIMENTS

Figure 2:
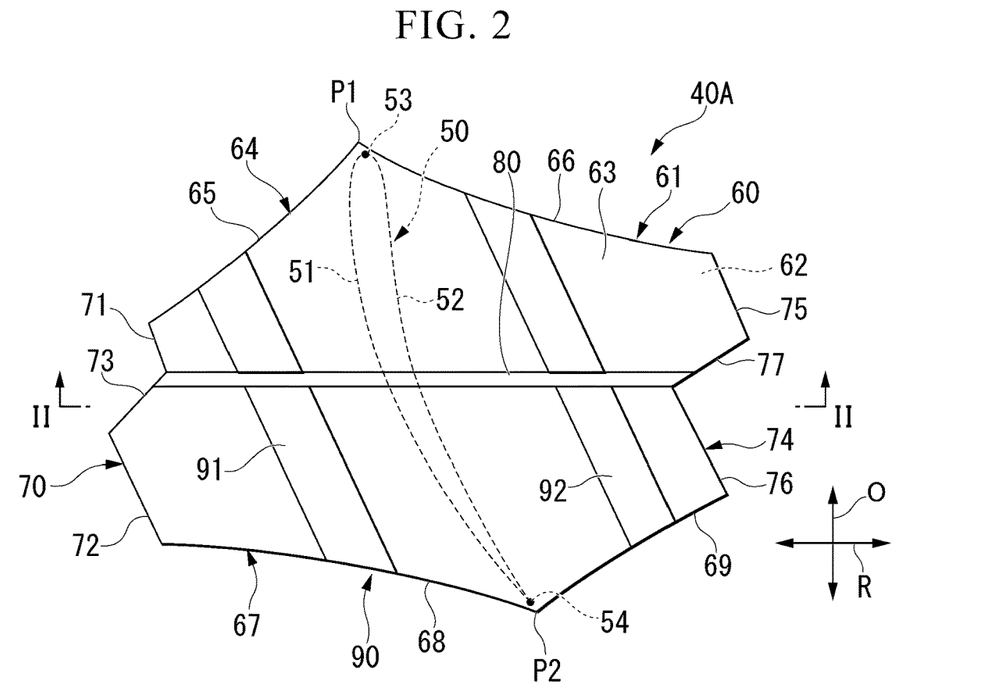
FIG. 2 is a diagram of a turbine blade according to the first embodiment as viewed from an outer side in a radial direction.
Figure 3:
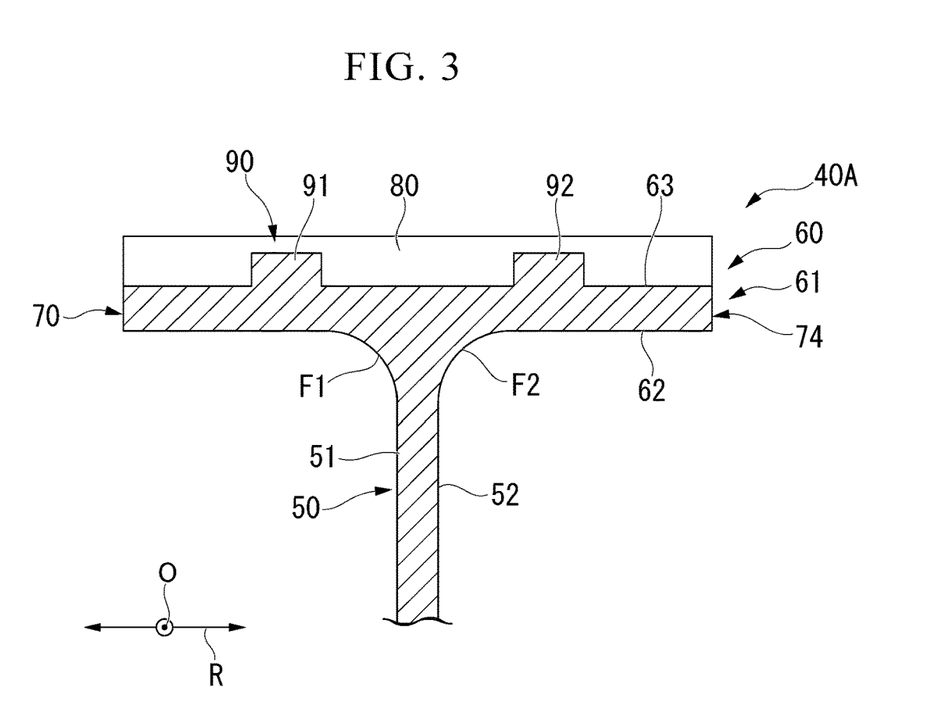
FIG. 3 is a cross-sectional view taken along the line II-II of FIG. 2.

Hereinafter, a first embodiment according to the present invention will be described with reference to FIGS. 1 to 3.

Figure 1:
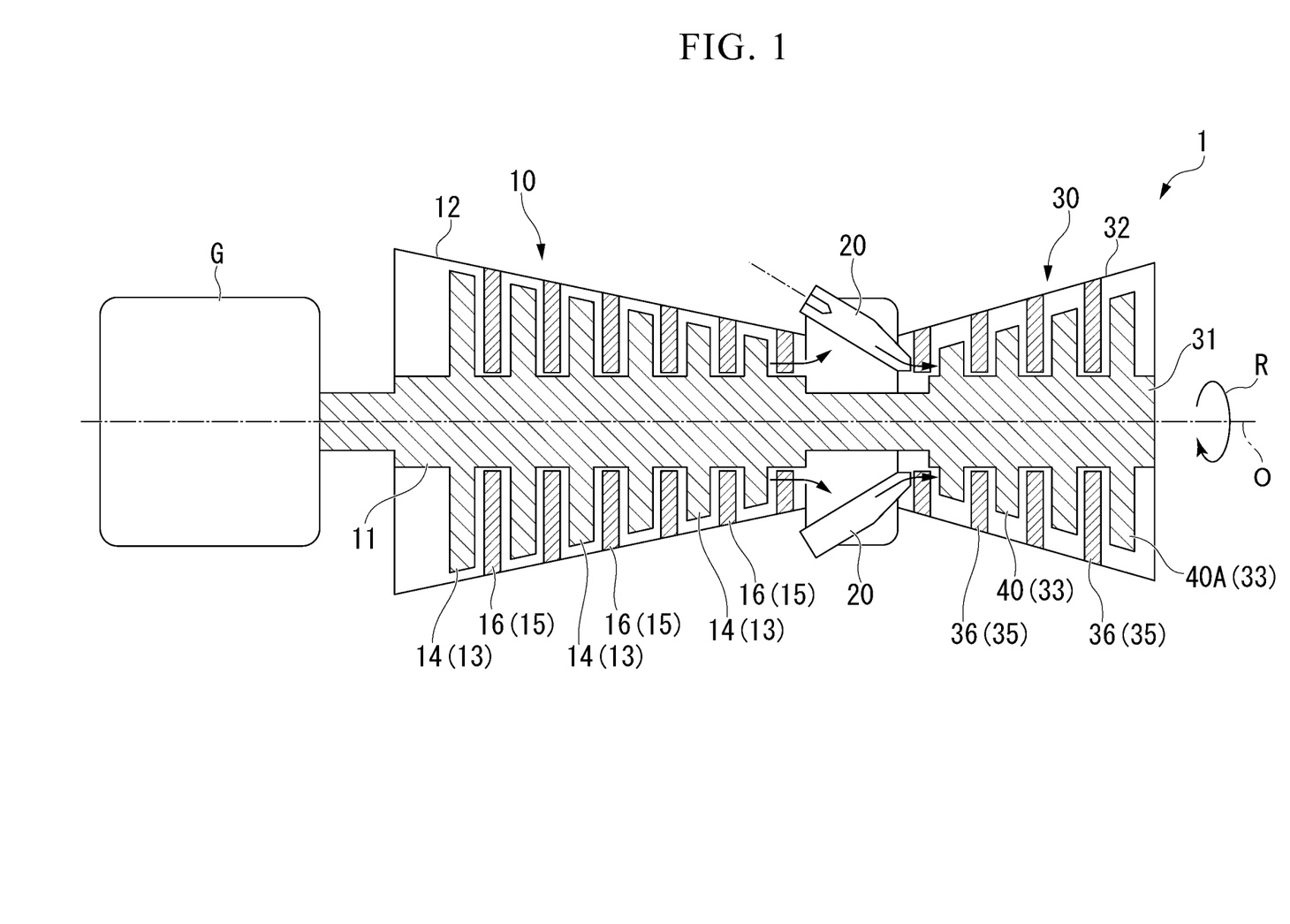
FIG. 1 is a schematic longitudinal sectional view of a gas turbine according to a first embodiment.

As illustrated in FIG. 1, a gas turbine 1 according to the present embodiment includes a compressor 10 which generates high-pressure air, a combustor 20 which generates a combustion gas by mixing the high-pressure air with fuel and combusting the mixture, and a gas turbine 30 driven by the combustion gas.

The compressor 10 has a compressor rotor 11 that rotates about an axis O, and a compressor casing 12 that covers the compressor rotor 11 from an outer circumferential side. The compressor rotor 11 has a columnar shape extending along the axis O. A plurality of compressor blade stages 13 arranged at intervals in the direction of the axis O are provided on the outer circumferential surface of the compressor rotor 11. Each compressor blade stage 13 has a plurality of compressor blades 14 arranged on the outer circumferential surface of the compressor rotor 11 at intervals in the circumferential direction of the axis O.

The compressor casing 12 has a cylindrical shape centered on the axis O. A plurality of compressor vane stages 15 arranged at intervals in the direction of the axis O are provided on the inner circumferential surface of the compressor casing 12. The compressor vane stages 15 are alternately arranged with respect to the above-described compressor blade stages 13 as viewed from the direction of the axis O. Each compressor vane stage 15 has a plurality of compressor vanes 16 arranged at intervals in the circumferential direction of the axis O on the inner circumferential surface of the compressor casing 12.

The combustor 20 is provided between the aforementioned compressor casing 12 and a turbine casing 32 to be described below. The high-pressure air generated by the compressor 10 is mixed with the fuel inside the combustor 20 to become a premixed gas. Inside the combustor 20, the premixed gas is combusted to generate a high-temperature and high-pressure combustion gas. The combustion gas is guided into the turbine casing 32 to drive the turbine 30.

The turbine 30 has a turbine rotor 31 that rotates about the axis O, and a turbine casing 32 that covers the turbine rotor 31 from the outer circumferential side. The turbine rotor 31 has a columnar shape extending along the axis O. A plurality of turbine blade stages 33 arranged at intervals in the direction of the axis O are provided on the outer circumferential surface of the turbine rotor 31. Each of the turbine blade stages 33 has a plurality of turbine blades 40 and 40A arranged at intervals in the circumferential direction of the axis O, on the outer circumferential surface of the turbine rotor 31. The turbine rotor 31 is integrally connected to the compressor rotor 11 in the direction of the axis O to form a gas turbine rotor.

The turbine casing 32 has a cylindrical shape centered on the axis O. A plurality of turbine vane stages 35 arranged at intervals in the direction of the axis O are provided on the inner circumferential surface of the turbine casing 32. The turbine vane stages 35 are alternately arranged with respect to the above-mentioned turbine blade stages 33 as viewed from the direction of the axis O. Each turbine vane stage 35 has a plurality of turbine vanes 36 arranged at intervals in the circumferential direction of the axis O, on the inner circumferential surface of the turbine casing 32. The turbine casing 32 is connected to the compressor casing 12 in the direction of the axis O to form a gas turbine 1 casing. That is, the above-described gas turbine 1 rotor is integrally rotatable about the axis O inside the gas turbine 1 casing.

Next, a detailed configuration of a turbine blade 40A in the turbine blade stage 33 of the final stage among the plurality of turbine blade stages 33 will be described with reference to FIGS. 2 and 3. In this embodiment, the present invention is applied only to the turbine blade 40A of the final stage.

The turbine blade 40A has a blade body 50, a shroud 60, and a reinforcing portion 90.

The blade body 50 has a blade shape extending in the radial direction of the axis O. The blade body 50 has a suction side 51 and a pressure side 52. The suction side 51 is a side facing one side in the circumferential direction of the axis O (a front side in the rotational direction R of the turbine rotor 31, and a left side in FIGS. 2 and 3), and has a convex curved surface shape that is convex on one side in the circumferential direction. The pressure side 52 is a side facing the other side in the circumferential direction of the axis O (a rear side in the rotational direction R of the turbine rotor 31, and a right side in FIGS. 2 and 3), and has a concave curved surface shape that is concave on one side in the circumferential direction.

The suction side 51 and the pressure side 52 are connected to each other on the one side in the direction of the axis O (upstream in the flow direction of the combustion gas), and a ridge line formed by the connection is a leading edge 53 of the blade body 50 extending in the radial direction. The suction side 51 and the pressure side 52 are connected to each other on the other side in the direction of the axis O (downstream in the flow direction of the combustion gas), and a ridge line formed by the connection is a trailing edge 54 of the blade body 50 extending in the radial direction.

The leading edge 53 of the blade body 50 is located closer to one side in the circumferential direction than the trailing edge 54.

The blade body 50 is configured so that a distance between the leading edge 53 and the trailing edge 54 (a cord length) decreases and a distance between the suction side 51 and the pressure side (a profile thickness) decreases toward the outer side in the radial direction. Further, a cooling flow passage through which the cooling air circulates is formed inside the blade body 50.

The shroud 60 has a shroud body 61 and a fin 80.

The shroud body 61 is integrally attached, for example, to a tip portion which is a radially outer side of the blade body 50, by welding or the like. The shroud body 61 has a plate shape extending in the direction of the axis O and the circumferential direction, and is provided to protrude in the circumferential direction from the tip portion of the blade body 50.

An inner circumferential surface 62 facing inward in the radial direction in the blade body 50 is fixed to the tip portion of the blade body 50 at a center portion in the circumferential direction. A first fillet portion F1 is formed at a portion on which the suction side 51 of the blade body 50 and the inner circumferential surface 62 of the shroud body 61 are connected, and a second fillet portion F2 is formed at a portion on which the pressure side 52 of the blade body 50 and the inner circumferential surface 62 of the shroud body 61 are connected.

The first fillet portion F1 has a curved surface shape that forms an arc which smoothly connects the suction side 51 of the blade body 50 and the inner circumferential surface 62 of the shroud body 61 in a cross-sectional shape parallel to the radial direction of the turbine rotor 31, and continues in a chord direction of the blade body 50 along the suction side 51 of the blade body 50 and the inner circumferential surface 62 of the shroud body 61. The second fillet portion F2 has a curved surface shape that forms an arc that smoothly connects the pressure side 52 of the blade body 50 and the inner circumferential surface 62 of the shroud body 61 in a cross-sectional shape parallel to the radial direction of the turbine rotor 31 (see FIG. 3), and continues in the chord direction of the blade body 50 along the pressure side 52 of the blade body 50 and the inner circumferential surface 62 of the shroud body 61.

The first and second fillet portions F1 and F2 are formed, for example, by welding portions (beads) when welding the blade body 50 and the shroud body 61.

An outer circumferential surface 63 facing outward in the radial direction of the shroud body 61 has a shape that protrudes toward the suction side 51 and the pressure side 52 of the blade body 50. That is, the outer circumferential surface 63 of the shroud body 61 has the same shape as the inner circumferential surface 62 of the shroud body 61 as viewed from the radial direction.

The inner circumferential surface 62 and the outer circumferential surface 63 of the shroud body 61 are radially connected by a front end surface 64, a rear end surface 67, a first side end surface 70 and a second side end surface 74.

The front end surface 64 is an end surface that forms one side (an upstream side in the direction of the axis O) of the shroud body 61 in the direction of the axis O. The front end surface 64 faces the upstream side of the combustion gas and extends in the circumferential direction. The front end surface 64 is formed on the leading edge 53 side of the blade body 50, and a part thereof is located further upstream than the leading edge 53.

The front end surface 64 has a first front end surface 65 and a second front end surface 66.

The first front end surface 65 extends toward one side in the circumferential direction with a position further upstream than the leading edge 53 of the blade body 50 as a reference point P1. The first front end surface 65 gradually extends toward the downstream side of the combustion gas from the reference point P1 to one side in the circumferential direction. The end portion of the first front end surface 65 on the circumferential one side and the downstream side is located on the downstream side of the leading edge 53 of the blade body 50 and on the upstream side of the trailing edge 54 of the blade body 50.

The second front end surface 66 extends toward the other side in the circumferential direction with a position similar to the reference point P1 of the first front end surface 65 as a reference point. The second front end surface 66 gradually extends toward the downstream side of the combustion gas from the reference point P1 to the other side in the circumferential direction. The end portion of the second front end surface 66 on the other circumferential side and the downstream side is located on the downstream side of the leading edge 53 of the blade body 50 and on the upstream side of the trailing edge 54 of the blade body 50. The first front end surface 65 and the second front end surface 66 intersect each other at the reference point P1 to form a ridge line.

In the present embodiment, a dimension in the circumferential direction of the second front end surface 66 is formed to be larger than that of the first front end surface 65. That is, the second front end surface 66 is longer than the first front end surface 65 in length when viewed in the radial direction.

The rear end surface 67 is an end surface that forms the other side (the downstream side in the direction of the axis O) of the shroud body 61 in the direction of the axis O. The rear end surface 67 faces the downstream side of the combustion gas and extends in the circumferential direction. The rear end surface 67 is formed on the trailing edge 54 side of the blade body 50, and a part thereof is located at a further downstream side of the trailing edge 54.

The rear end surface 67 has a first rear end surface 68 and a second rear end surface 69.

The first rear end surface 68 extends toward one side in the circumferential direction with a position further downstream than the trailing edge 54 of the blade body 50 as a reference point P2. The first rear end surface 68 gradually extends toward the upstream side of the combustion gas from the reference point P2 to one side in the circumferential direction. The end portion of the first rear end surface on the circumferential one side and the upstream side is located on the upstream side of the trailing edge 54 of the blade body 50 and on the downstream side of the leading edge 53 of the blade body 50.

The second rear end surface 69 extends toward the other side in the circumferential direction with a position similar to the reference point P2 of the first rear end surface 68 as a reference point P2. The second rear end surface 69 gradually extends toward the upstream side of the combustion gas from the reference point P2 to the other side in the circumferential direction. The end portion of the second rear end surface 69 on the circumferential other side and the upstream end is located on the upstream side of the trailing edge 54 of the blade body 50 and on the downstream side of the leading edge 53 of the blade body 50. The first rear end surface 68 and the second rear end surface 69 intersect each other at the reference point P2 to form a ridge line.

In the present embodiment, the dimension in the circumferential direction of the first rear end surface 68 is formed to be larger than that of the second rear end surface 69. That is, the first rear end surface 68 is longer than the second rear end surface 69 in length when viewed in the radial direction.

The first side end surface 70 is an end surface that forms a circumferential one side (the front side in the rotational direction R) of the shroud body 61. The first side end surface 70 connects the inner circumferential surface 62 and the outer circumferential surface 63 of the shroud body 61, and connects the first front end surface 65 and the first rear end surface 68 in the direction of the axis O. The first side end surface 70 has a first front side surface 71, a first rear side surface 72 and a first contact surface 73.

The end portion of the upstream side of the first front side surface 71 is connected to the first front end surface 65, and extends toward the downstream side and the other side in the circumferential direction.

The end portion of the downstream side of the first rear side surface 72 is connected to the first rear end surface 68, and extends toward the upstream side and one side in the circumferential direction.

The first contact surface 73 connects the first front side surface 71 and the first rear side surface 72. The first contact surface 73 extends from the connection part with the first front side surface 71 toward the downstream side and one side in the circumferential direction, and is connected to the first rear side surface 72. The first contact surface 73 may be inclined to face inward or outward in the radial direction.

The second side end surface 74 is an end surface that forms the other circumferential side (the rear side in the rotational direction R) of the shroud body 61. The second side end surface 74 connects the inner circumferential surface 62 and the outer circumferential surface 63 of the shroud body 61, and connects the second front end surface 66 and the second rear end surface 69 in the direction of the axis O. The second side end surface 74 has a second front side surface 75, a second rear side surface 76 and a second contact surface 77.

The end portion of the upstream side of the second front side surface 75 is connected to the second front end surface 66, and extends toward the downstream side and the other side in the circumferential direction.

The end portion of the downstream side of the second rear side surface 76 is connected to the second rear end surface 69, and extends toward the upstream side and one side in the circumferential direction.

The second contact surface 77 connects the second front side surface 75 and the second rear side surface 76. The second contact surface 77 extends from the connection part with the second front side surface 75 toward the downstream side and one side in the circumferential direction, and is connected to the second rear side surface 76. The second contact surface 77 may be inclined to face outward or inward in the radial direction.

When the turbine blade stage 33 is configured by the plurality of turbine blades 40A, the first contact surface 73 and the second contact surface 77 of the turbine blades 40A adjacent to each other come into contact with each other. Thus, the rigidity of the whole blade stage is secured.

The fins 80 protrude from the outer circumferential surface 63 of the shroud body 61 and extend in the circumferential direction. The fins 80 extend over the first side end surface 70 and the second side end surface 74 of the shroud body 61. The fins 80 extend in the circumferential direction from a boundary between the first front side surface 71 and the first contact surface 73 to a boundary between the second front side surface 75 and the second contact surface 77 of the shroud body 61.

A reinforcing portion 90 is provided to protrude from the outer circumferential surface 63 of the shroud 60 and extends over the front end surface 64 and the rear end surface 67. The reinforcing portion 90 has a first reinforcing rib 91 and a second reinforcing rib 92.

The first reinforcing rib 91 extends continuously over the first front end surface 65 and the first rear end surface 68. The first reinforcing rib 91 is formed further toward one circumferential side than the suction side 51 of the blade body 50 on the outer circumferential surface 63 of the shroud body 61. That is, the first reinforcing rib 91 is disposed to be separated from the suction side 51 on the front side in the rotational direction R to which the suction side 51 faces when viewed from the radial direction. The first reinforcing rib 91 extends to face the other side in the circumferential direction from the first front end surface 65 toward the first rear end surface 68. That is, the first reinforcing rib 91 extends along the suction side 51 of the blade body 50.

The second reinforcing rib 92 continuously extends over the second front end surface 66 and the second rear end surface 69. The second reinforcing rib 92 is formed further toward the other circumferential side than the pressure side 52 of the blade body 50 on the outer circumferential surface 63 of the shroud body 61. That is, the second reinforcing rib 92 is disposed to be separated from the pressure side 52 on the rear side in the rotational direction R to which the pressure side 52 faces when viewed from the radial direction. The second reinforcing rib 92 extends to face the other side in the circumferential direction from the second front end surface 66 toward the second rear end surface 69. That is, the second reinforcing rib 92 extends along the pressure side 52 of the blade body 50.

When viewed from the radial direction, the blade body 50 is sandwiched by the first reinforcing rib 91 and the second reinforcing rib 92 from the circumferential direction.

The dimension in the width direction orthogonal to the extending direction of the first reinforcing rib 91 and the second reinforcing rib 92 is larger than the width dimension orthogonal to the extending direction of the fin 80.

The heights (dimensions in the radial direction) of the first reinforcing rib 91 and the second reinforcing rib 92 are smaller than the height of the fin 80.

Next, the operation and effects of the gas turbine 1 and the turbine blade 40A configured as described above will be described.

In order to operate the gas turbine 1, first, the compressor rotor 11 (the gas turbine rotor) is rotationally driven by an external drive source. With rotation of the compressor rotor 11, the external air is sequentially compressed to generate high-pressure air. The high-pressure air is supplied into the combustor 20 through the space inside the compressor casing 12.

In the combustor 20, the fuel supplied from the fuel nozzle is mixed with the high-pressure air and combusted to generate a high-temperature and high-pressure combustion gas. The combustion gas is supplied into the turbine 30 through the space inside the turbine casing 32. When the combustion gas sequentially collides with the turbine blade stages 33 and the turbine vane stages 35 inside the turbine 30, a rotational driving force is given to the turbine rotor 31 (the gas turbine 1 rotor). The rotational energy is used to drive a generator G or the like connected to the shaft end. Further, the combustion gas is finally discharged to the outside via an exhaust diffuser through the turbine blades 40A of the final stage.

Here, the turbine blade 40A of the final stage generally has a longer blade length than that of the turbine blades 40 of other stages. Therefore, at the time of operation of the gas turbine 1, the turbine blade 40A of the final stage is affected by the centrifugal force, and in particular, a stress at the root portion of the shroud body 61 with respect to the blade body 50 increases.

In contrast, in the present embodiment, the reinforcing portion 90 is formed over the front end surface 64 and the rear end surface 67 of the shroud body 61. Therefore, the reinforcing portion 90 exists over the entire region between the leading edge 53 and the trailing edge 54 of the blade body 50. For this reason, a rigidity can be secured in the entire region of the root portion of the shroud 60 with respect to the blade body 50.

Here, in order to increase the rigidity at the root portion of the shroud body 61, for example, it is conceivable to reinforce the inner circumferential surface 62 of the shroud body 61, and for example, it is also conceivable to secure the rigidity by enlarging the fillet portions F1 and F2. However, in this case, when enlarging the fillet, since the flow passage of the combustion gas is narrowed, the efficiency of the turbine 30 is lowered. In the present embodiment, since the reinforcing portion 90 is formed on the outer circumferential surface 63 of the shroud body 61, the enlargement of the fillet can be minimized. Therefore, the rigidity of the shroud body 61 can be enhanced, while avoiding the decrease in efficiency of the turbine 30.

In addition, when the reinforcing portion 90 exists only in a part of the front end surface 64 and the rear end surface 67, a portion with high rigidity and a portion with low rigidity exist between the front end surface 64 and the rear end surface 67. In such a case, if the centrifugal force acting on the shroud 60 is very large, it is still insufficient to ensure the rigidity of the root portion of the shroud 60. Since the root portion exists over the entire region of the suction side 51 and the pressure side 52 of the blade body 50 in the direction of the axis O, by providing the reinforcing portion 90 over the front end surface 64 and the rear end surface 67, sufficient rigidity can be ensured for the first time.

Furthermore, in the present embodiment, the first reinforcing rib 91 is formed over the first front end surface 65 and the first rear end surface 68, that is, formed on the suction side 51 side of the blade body 50. Thus, it is possible to appropriately secure the rigidity of the root portion of the shroud body 61 with respect to the blade body 50 on the suction side 51 side.

Furthermore, a second reinforcing rib 92 is formed over the second front end surface 66 and the second rear end surface 69, that is, formed on the pressure side 52 side of the blade body 50. Therefore, it is possible to appropriately secure the rigidity of the root portion of the shroud body 61 with respect to the blade body 50 on the pressure side 52 side.

Therefore, according to the present embodiment, the rigidity can be maintained in a well-balanced manner for both the root portions of the shroud body 61 on the suction side 51 side and the pressure side 52 side of the blade body 50. Thus, it is possible to effectively suppress the shroud body 61 from being deformed to turn up with respect to the blade body 50.

Figure 4:
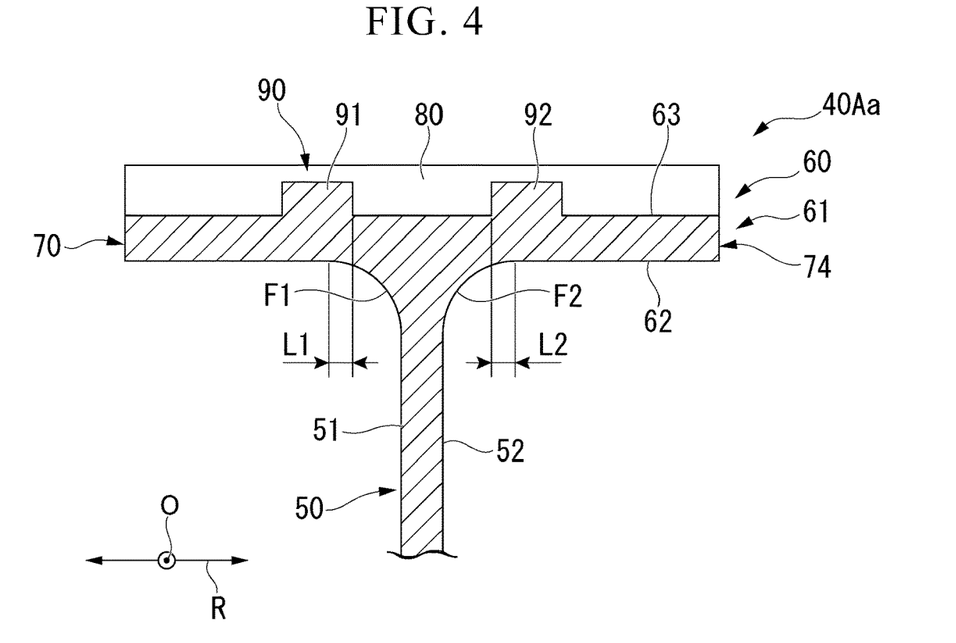
FIG. 4 is a diagram of a turbine blade according to a modified example of the first embodiment as viewed from the outer side in the radial direction.

Furthermore, a modified example of the first embodiment will be described with reference to FIG. 4. A turbine blade 40Aa illustrated in FIG. 4 is a blade of the final stage as in the turbine blade 40A of the first embodiment. When the turbine blade 40Aa is viewed in cross section in parallel to the radial direction of the turbine rotor, a first reinforcing rib 91 is formed at a position which overlaps the first fillet portion F1 in the circumferential direction of the turbine rotor 13 (the rotational direction R) across the shroud body 61 (an overlapping portion L1). A second reinforcing rib 92 is formed at a position which overlaps the second fillet portion F2 in the circumferential direction (the rotational direction R) of the turbine rotor 13 across the shroud body 61 (an overlapping portion L2).

A centrifugal force acts on the shroud body 61 radially outward with the rotation of the turbine blade 40. However, as the turbine blade 40 is made longer in length for the purpose of improving the operation efficiency of the gas turbine 1, since the centrifugal force acting on the shroud body 61 also increases, it is necessary to take measures. In the modified example, the first reinforcing rib 91 overlaps the first fillet portion F1 formed in a portion on which the suction side 51 of the blade body 50 and the inner circumferential surface 62 of the shroud body 61 are connected, in the circumferential direction across the shroud body 62. Thus, the higher rigidity than other portions is imparted to the shroud body 61 between the portion on which the first reinforcing rib 91 is formed and the suction side 51 of the blade body 50.

Furthermore, the second reinforcing rib 92 also overlaps the second fillet portion F2 formed in a portion on which the pressure side 52 of the blade body 50 and the inner circumferential surface 62 of the shroud body 61 are connected, in the circumferential direction across the shroud body 61. Thus, the higher rigidity than those of other portions is also imparted to the shroud body 61 between the portion on which the second reinforcing rib 92 is formed and the pressure side 52 of the blade body 50.

Therefore, according to the present modified example, even if the centrifugal force acting by the rotation of the turbine rotor 31 on the shroud body 61 of the portion on which the first reinforcing rib 91 and the second reinforcing rib 92 are formed increases, it is possible to suppress an occurrence of deformation such as warpage in the shroud body 61 due to the centrifugal force.

Next, a second embodiment of the present invention will be described with reference to FIG. 5. In the second embodiment, the same constituent elements as those in the first embodiment are denoted by the same reference numerals, and the detailed description thereof will not be provided.

Figure 5:
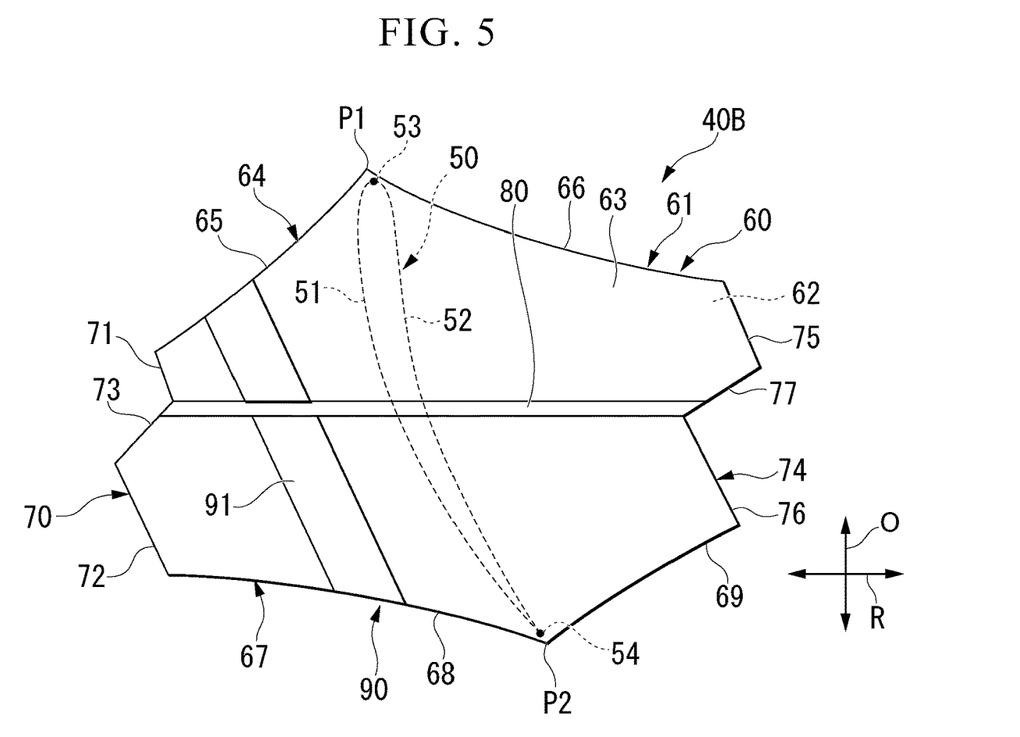
FIG. 5 is a diagram of a turbine blade according to a second embodiment as viewed from the outer side in the radial direction.

A turbine blade 40B illustrated in FIG. 5 is a blade of the final stage as in the turbine blade 40A of the first embodiment, but includes only a first reinforcing rib 91 as the reinforcing portion 90 and does not include the second reinforcing rib (92) of the first embodiment.

According to a structure of the turbine blade 40B, in some cases, the stress may increase at the root portion of the shroud body 61, particularly only on the suction side 51 side of the blade body 50. In such a case, it is possible to appropriately cope with the stress, by providing only the first reinforcing rib 91. Further, since the weight of the shroud 60 itself is reduced as compared with the case in which the second reinforcing rib 92 is provided, the influence of the centrifugal force can be suppressed.

Furthermore, a modified example of the second embodiment will be described with reference to FIG. 6.

Figure 6:
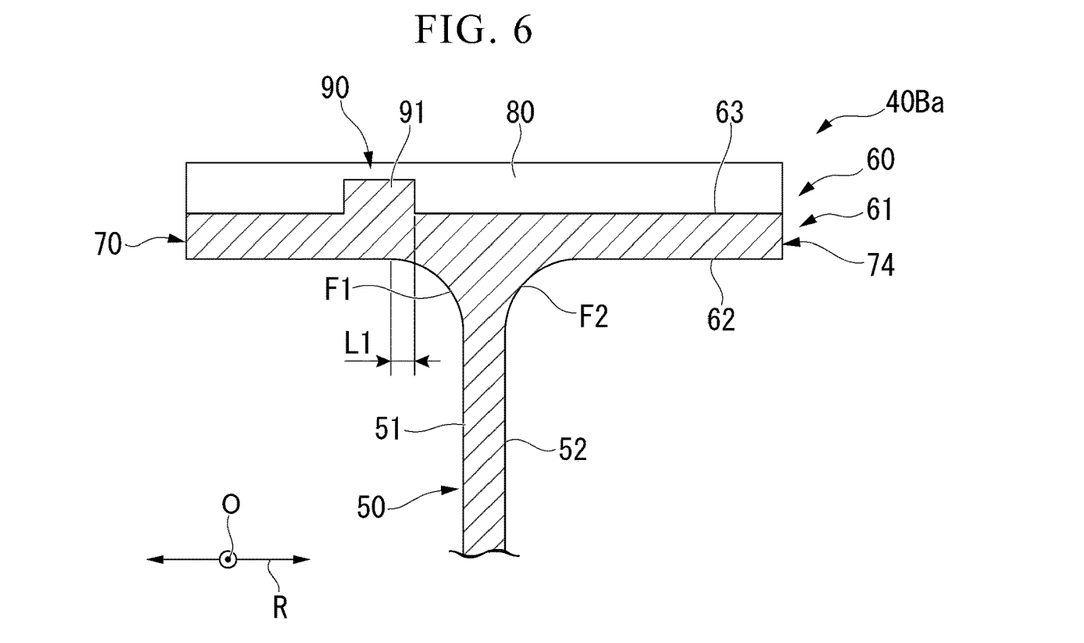
FIG. 6 is a diagram of a turbine blade according to a modified example of the second embodiment as viewed from the outer side in the radial direction.

A turbine blade 40Ba illustrated in FIG. 6 is also a blade of the final stage, as in the turbine blade 40B of the second embodiment. A first fillet portion F1 having the same structure as that of the modified example of the first embodiment is provided in a portion of the turbine blade 40Ba on which the suction side 51 of the blade body 50 and the inner circumferential surface 62 of the shroud body 61 are connected. The first fillet portion F1 overlaps the first reinforcing rib 91 across the shroud body 61 (an overlapping portion L1). Further, the second reinforcing rib (92) is not provided on the turbine blade 40Ba.

According to this modified example, since the first reinforcing rib 91 overlaps the first fillet portion F1 in the circumferential direction across the shroud body 62, the higher rigidity than other portions is imparted to the shroud body 61 between the portion in which the first reinforcing rib 91 is formed and the suction side 51 of the blade body 50. As a result, even if the centrifugal force acting on the shroud body 61 of the portion, in which the first reinforcing rib 91 is formed, by the rotation of the turbine rotor 31 increases with the increase in length of the blade, it is possible to suppress the occurrence of deformation such as warpage in the shroud body 61 due to the centrifugal force.

Next, a third embodiment of the present invention will be described with reference to FIG. 7. In the third embodiment, the same constituent elements as those of the first embodiment are denoted by the same reference numerals, and the detailed description thereof will not be provided.

Figure 7:
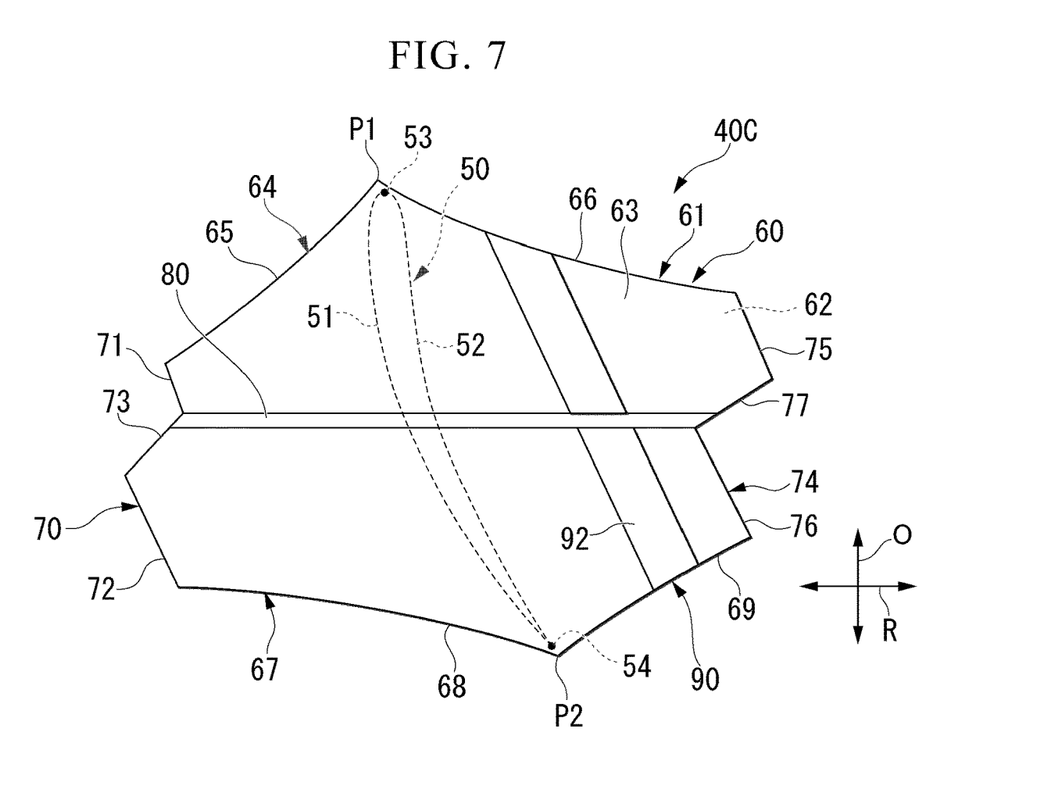
FIG. 7 is a diagram of a turbine blade according to a third embodiment as viewed from the outer side in the radial direction.

A turbine blade 40C illustrated in FIG. 7 is a rotor blade of the final stage as in the turbine blade 40A of the first embodiment, but includes only the second reinforcing rib 92 as the reinforcing portion 90 and does not include the first reinforcing rib 91 of the first embodiment.

According to a structure of the turbine blade 40C, in some cases, the stress may increase at the root portion of the shroud body 61, particularly only on the pressure side 52 side of the blade body 50. In such a case, only the second reinforcing rib 92 may be provided. Therefore, the deformation of the shroud body 61 can be suppressed.

Furthermore, a modified example of the third embodiment will be described with reference to FIG. 8.

Figure 8:
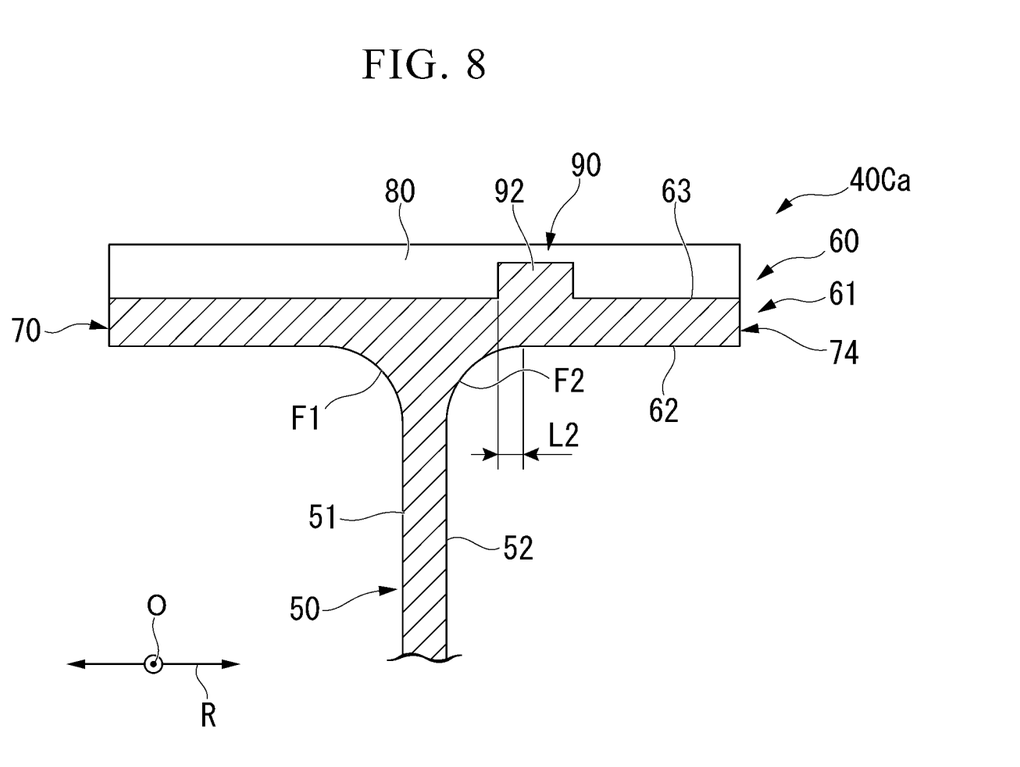
FIG. 8 is a diagram of a turbine blade according to a modified example of the third embodiment as viewed from the outer side in the radial direction.

A turbine blade 40Ca illustrated in FIG. 8 is also a blade of the final stage, as in the turbine blade 40C of the third embodiment. A second fillet portion F2 having the same structure as that of the modified example of the first embodiment is provided in a portion of the turbine blade 40Ca in which the pressure side 52 of the blade body 50 and the inner circumferential surface 62 of the shroud body 61 are connected. The second reinforcing rib 92 overlaps the second fillet portion F2 across the shroud body 61 (an overlapping portion L2). The turbine blade 40Ca is not provided with the first reinforcing rib (91).

According to this modified example, since the second fillet portion F2 circumferentially overlaps the second reinforcing rib 92 across the shroud body 62, the higher rigidity than those of other portions is imparted to the shroud body 61 between the portion in which the second reinforcing rib 92 is formed and the pressure side 52 of the blade body 50. As a result, even if the centrifugal force acting on the shroud body 61 of the portion, in which the second reinforcing rib 92 is formed, by the rotation of the turbine rotor 31 increases with the increase in length of the blades, it is possible to suppress the occurrence of deformation such as warpage in the shroud body 61 due to the centrifugal force.

As mentioned above, although the embodiments of this invention and the modified examples thereof are described, this invention can be suitably changed in the scope which does not depart from the technical idea of the invention, without being limited thereto.

For example, although the case in which the single fin 80 was provided was described in each embodiment described above, a plurality of fins 80 may be provided.

The first reinforcing rib 91 may have a curved shape along the suction side 51 of the blade body 50 when viewed from the radial direction. The second reinforcing rib 92 may have a curved shape along the pressure side 52 of the blade body 50 when viewed in the radial direction.

The width dimensions (dimensions in the circumferential direction orthogonal to the extending direction) of the first reinforcing rib 91 and the second reinforcing rib 92 may change from the front end surface 64 to the rear end surface 67. For example, the width dimensions may increase gradually or may decrease gradually toward the rear end surface 67.

The width dimensions of the first reinforcing rib 91 and the second reinforcing rib 92 may increase and then decrease from the front end surface 64 toward the rear end surface 67. The change of the width dimension may be changed to correspond to the dimension of the thickness of the blade body 50 (the circumferential distance between the suction side 51 and the pressure side 52).

Further, as in the width dimension, the heights (dimensions in the radial direction) of the first reinforcing rib 91 and the second reinforcing rib 92 may be changed.

Although the present invention is applied only to the turbine blade of the final stage in each of the above-described embodiments and the modified examples thereof, the present invention may be applied to other turbine blades other than the final stage.

Industrial Applicability

The present invention relates to a turbine blade and a gas turbine. According to the present invention, it is possible to resist the stress occurring in the shroud, while suppressing the decrease in efficiency.

REFERENCE SIGNS LIST

1 Gas turbine
10 Compressor
11 Compressor rotor
12 Compressor casing
13 Compression blade stage
14 Compression blade
15 Compressor vane stage
16 Compressor vane
20 Combustor
30 Turbine
31 Turbine rotor
32 Turbine casing
33 Turbine blade stage
35 Turbine vane stage
36 Turbine vane
40 Turbine blade
40A, 40Aa, 40B, 40Ba, 40C, 40Ca Turbine blade
50 Blade body
51 Suction side
52 Pressure side
53 Leading edge
54 Trailing edge
60 Shroud
61 Shroud body
62 Inner circumferential surface
63 Outer circumferential surface
64 Front end surface
65 First front end surface
66 Second front end surface
67 Rear end surface
68 First rear end surface
69 Second rear end surface
70 First side end surface
71 First front side surface
72 First rear side surface
73 First contact surface
74 Second side end surface
75 Second front side surface
76 Second rear side surface
77 Second contact surface
80 Fin
90 Reinforcing portion
91 First reinforcing rib
92 Second reinforcing rib
G Generator
F1 First fillet portion
F2 Second fillet portion
O Axis
R Rotational direction
P1, P2 Reference point

The invention claimed is:
1. A turbine blade comprising:
a blade body in which a suction side facing one side in a circumferential direction and a pressure side facing the other side in the circumferential direction are connected at a leading edge and a trailing edge and which extends in a radial direction; and
a shroud provided at a tip which is a radially outer end portion of the blade body,
wherein the shroud includes
a shroud body which has an outer circumferential surface facing radially outward, a front end surface extending to both sides in the circumferential direction with a leading edge side of the blade body as a reference point, a rear end surface extending to both sides in the circumferential direction with a trailing edge side of the blade body as a reference point, and a contact surface provided on both sides in the circumferential direction, and a reinforcing portion which protrudes from the outer circumferential surface and extends over the front end surface and the rear end surface, wherein the front end surface has a first front end surface extending from the reference point of the leading edge side to said one side in the circumferential direction, and a second front end surface extending to intersect the first front end surface from the reference point of the leading edge side toward said other side in the circumferential direction, wherein the rear end surface has a first rear end surface extending from the reference point of the trailing edge side to said one side in the circumferential direction, and a second rear end surface extending to intersect the first rear end surface from the reference point of the trailing edge side toward said other side in the circumferential direction, and wherein the reinforcing portion has a first reinforcing rib extending over the first front end surface and the first rear end surface.

2. The turbine blade according to claim 1, wherein the shroud includes a first fillet portion which is formed at a portion on which the suction side of the blade body and an inner circumferential surface of the shroud body are connected, and which extends to form a curved surface shape from the suction side of the blade body to the inner circumferential surface of the shroud body, and the first reinforcing rib is disposed to overlap the first fillet portion in the circumferential direction across the shroud body.

3. The turbine blade according to claim 1, wherein the reinforcing portion has a second reinforcing rib extending over the second front end surface and the second rear end surface.

4. The turbine blade according to claim 3, wherein the shroud includes a second fillet portion which is formed at the portion on which the pressure side of the blade body and an inner circumferential surface of the shroud body are connected, and which extends to form a curved line from the pressure side of the blade body to the inner circumferential surface of the shroud body, and the second reinforcing rib is disposed to overlap the second fillet portion in the circumferential direction across the shroud body.

5. A turbine blade comprising:

a blade body in which a suction side facing one side in a circumferential direction and a pressure side facing the other side in the circumferential direction are connected at a leading edge and a trailing edge and which extends in a radial direction; and a shroud provided at a tip which is a radially outer end portion of the blade body, wherein the shroud includes a shroud body which has an outer circumferential surface facing radially outward, a front end surface extending to both sides in the circumferential direction with a leading edge side of the blade body as a reference point, a rear end surface extending to both sides in the circumferential direction with a trailing edge side of the blade body as a reference point, and a contact surface provided on both sides in the circumferential direction, and a reinforcing portion which protrudes from the outer circumferential surface and extends over the front end surface and the rear end surface, wherein the front end surface has a first front end surface extending from the reference point of the leading edge side to said one side in the circumferential direction, and a second front end surface extending to intersect the first front end surface from the reference point of the leading edge side toward said other side in the circumferential direction, wherein the rear end surface has a first rear end surface extending from the reference point of the trailing edge side to said one side in the circumferential direction, and a second rear end surface extending to intersect the first rear end surface from the reference point of the trailing edge side toward said other side in the circumferential direction, and wherein the reinforcing portion has a second reinforcing rib extending over the second front end surface and the second rear end surface.

6. The turbine blade according to claim 5, wherein the shroud includes a second fillet portion which is formed at a portion on which the pressure side of the blade body and an inner circumferential surface of the shroud body are connected, and which extends to form a curved surface shape from the pressure side of the blade body to the inner circumferential surface of the shroud body, and the second reinforcing rib is disposed to overlap the second fillet portion in the circumferential direction across the shroud body.

7. A gas turbine comprising:

a compressor which compresses air to generate high-pressure air;

a combustor which combusts the high-pressure air to generate a combustion gas; and a turbine which includes a plurality of blade stages in which a plurality of blades are arranged in a circumferential direction, and is driven by the combustion gas, wherein the blades of a last blade stage among the plurality of blade stages are turbine blades according to claim 1.

8. The turbine blade according to claim 2, wherein the reinforcing portion has a second reinforcing rib extending over the second front end surface and the second rear end surface.

9. The turbine blade according to claim 8, wherein the shroud includes a second fillet portion which is formed at the portion on which the pressure side of the blade body and an inner circumferential surface of the shroud body are connected, and which extends to form a curved line from the pressure side of the blade body to the inner circumferential surface of the shroud body, and the second reinforcing rib is disposed to overlap the second fillet portion in the circumferential direction across the shroud body.

10. A gas turbine comprising:

a compressor which compresses air to generate high-pressure air;

a combustor which combusts the high-pressure air to generate a combustion gas; and a turbine which includes a plurality of blade stages in which a plurality of blades are arranged in a circumferential direction, and is driven by the combustion gas, wherein the blades of a last blade stage among the plurality of blade stages are turbine blades according to claim 2.

11. A gas turbine comprising:
a compressor which compresses air to generate high-pressure air;
a combustor which combusts the high-pressure air to generate a combustion gas; and
a turbine which includes a plurality of blade stages in which a plurality of blades are arranged in a circumferential direction, and is driven by the combustion gas,
wherein the blades of a last blade stage among the plurality of blade stages are turbine blades according to claim 3.

12. A gas turbine comprising:
a compressor which compresses air to generate high-pressure air;
a combustor which combusts the high-pressure air to generate a combustion gas; and
a turbine which includes a plurality of blade stages in which a plurality of blades are arranged in a circumferential direction, and is driven by the combustion gas,
wherein the blades of a last blade stage among the plurality of blade stages are turbine blades according to claim 4.

13. A gas turbine comprising:
a compressor which compresses air to generate high-pressure air;
a combustor which combusts the high-pressure air to generate a combustion gas; and
a turbine which includes a plurality of blade stages in which a plurality of blades are arranged in a circumferential direction, and is driven by the combustion gas,
wherein the blades of a last blade stage among the plurality of blade stages are turbine blades according to claim 5.

14. A gas turbine comprising:
a compressor which compresses air to generate high-pressure air;
a combustor which combusts the high-pressure air to generate a combustion gas; and
a turbine which includes a plurality of blade stages in which a plurality of blades are arranged in a circumferential direction, and is driven by the combustion gas,
wherein the blades of a last blade stage among the plurality of blade stages are turbine blades according to claim 6.

* * * * *